United States Patent
Patney et al.

(10) Patent No.: US 11,836,597 B2
(45) Date of Patent: Dec. 5, 2023

(54) DETECTING VISUAL ARTIFACTS IN IMAGE SEQUENCES USING A NEURAL NETWORK MODEL

(71) Applicant: NVIDIA Corporation, Santa Clara, CA (US)

(72) Inventors: Anjul Patney, Redmond, WA (US); Aaron Eliot Lefohn, Kirkland, WA (US)

(73) Assignee: NVIDIA Corporation, Santa Clara, CA (US)

( * ) Notice: Subject to any disclaimer, the term of this patent is extended or adjusted under 35 U.S.C. 154(b) by 689 days.

(21) Appl. No.: 16/397,511

(22) Filed: Apr. 29, 2019

(65) Prior Publication Data

US 2020/0050923 A1    Feb. 13, 2020

Related U.S. Application Data

(60) Provisional application No. 62/716,750, filed on Aug. 9, 2018.

(51) Int. Cl.
*G06N 3/045* (2023.01)
*G06T 5/00* (2006.01)
*G06T 7/00* (2017.01)

(52) U.S. Cl.
CPC ............. *G06N 3/045* (2023.01); *G06T 5/002* (2013.01); *G06T 7/0008* (2013.01)

(58) Field of Classification Search
CPC ........ G06N 3/0454; G06N 3/084; G06N 3/08; G06N 3/04; G06N 3/0445; G06N 3/045; G06N 5/01; G06T 5/001–009; G06T 7/0002–0012; G06T 2207/20084; G06T 2207/20081; G06T 2207/30168; G06T 2207/20021; G06T 2207/20076; G06T 5/002; G06T 7/0008; G06T 7/11; G06T 15/08; G06T 7/00; G06K 9/036;
(Continued)

(56) References Cited

U.S. PATENT DOCUMENTS 10,402,697 B2 *   9/2019   Yang .................... G06N 3/0454
10,721,471 B2 *   7/2020   Zhang .................... H04N 19/59
(Continued)

OTHER PUBLICATIONS

Abadi, M., et al., "TensorFlow: Large-Scale Machine Learning on Heterogeneous Sysetms," (2015).
(Continued)

*Primary Examiner* — Michael S Osinski
(74) *Attorney, Agent, or Firm* — Davis Wright Tremaine LLP

(57) ABSTRACT

Motivated by the ability of humans to quickly and accurately detect visual artifacts in images, a neural network model is trained to identify and locate visual artifacts in a sequence of rendered images without comparing the sequence of rendered images against a ground truth reference. Examples of visual artifacts include aliasing, blurriness, mosaicking, and overexposure. The neural network model provides a useful fully-automated tool for evaluating the quality of images produced by rendering systems. The neural network model may be trained to evaluate the quality of images for video processing, encoding, and/or compression techniques. In an embodiment, the sequence includes at least four images corresponding to a video or animation.

18 Claims, 14 Drawing Sheets

(58) Field of Classification Search
CPC .. G06K 9/4628; G06K 9/6256; G06K 9/6267;
G06K 9/66; G06K 9/00718; G06K
9/00771; G06K 9/46; G06K 9/00147;
G06K 9/00624; G06K 9/0063; G06K
9/00664; G06K 9/00711; G06K 9/00744;
G06K 9/00765; G06K 9/00791; G06V
10/82; G06V 10/764; G06V 10/454;
G06V 10/993; G06V 10/50; G06V 20/10;
G06V 20/41; G06V 20/52; G06V
2201/03; G16H 30/40; G16H 50/20;
H04N 19/154; H04N 19/124; H04N
19/136; H04N 19/172; H04N 17/004;
H04N 19/103; H04N 19/159; G06F
18/214; G06F 18/24
See application file for complete search history.

(56) References Cited

U.S. PATENT DOCUMENTS

| | | | | |
|---|---|---|---|---|
| 2004/0156559 A1* | 8/2004 | Cheng | H04N 19/60 | 382/286 |
| 2007/0153023 A1* | 7/2007 | Chladny | G06T 15/20 | 345/611 |
| 2008/0012856 A1* | 1/2008 | Yu | G06T 7/0012 | 345/424 |
| 2008/0129732 A1* | 6/2008 | Johnson | G06T 7/0002 | 345/424 |
| 2008/0150937 A1* | 6/2008 | Lundstrom | G06T 15/005 | 345/419 |
| 2009/0028399 A1* | 1/2009 | Krishnan | G06T 5/002 | 382/128 |
| 2009/0141932 A1* | 6/2009 | Jones | G06V 10/993 | 382/100 |
| 2010/0034420 A1* | 2/2010 | Xiong | G06T 7/90 | 382/100 |
| 2010/0303306 A1* | 12/2010 | Pnueli | G06T 7/0002 | 382/112 |
| 2012/0213440 A1* | 8/2012 | Tappen | G06T 7/41 | 382/173 |
| 2012/0269441 A1* | 10/2012 | Marchesotti | G06K 9/6269 | 382/195 |
| 2013/0188866 A1* | 7/2013 | Obrador | G06K 9/00664 | 382/165 |
| 2014/0152849 A1* | 6/2014 | Bala | H04N 1/3872 | 348/207.1 |
| 2014/0321558 A1* | 10/2014 | Gu | H04N 19/103 | 375/240.27 |
| 2015/0071547 A1* | 3/2015 | Keating | H04N 5/23293 | 382/195 |
| 2015/0199478 A1* | 7/2015 | Bhatia | G16H 30/40 | 382/128 |
| 2015/0302637 A1* | 10/2015 | Glaser | G06T 15/06 | 345/426 |
| 2016/0321523 A1* | 11/2016 | Sen | G06T 15/06 | |
| 2016/0350963 A1* | 12/2016 | Petkov | H04L 65/4069 | |
| 2017/0061249 A1* | 3/2017 | Estrada | G06T 5/005 | |
| 2017/0323431 A1* | 11/2017 | Sarkar | G06T 5/003 | |
| 2017/0345131 A1* | 11/2017 | Wu | G06T 5/20 | |
| 2017/0345170 A1* | 11/2017 | Carmel | G06T 7/44 | |
| 2018/0336672 A1* | 11/2018 | Perticone | G08B 13/189 | |
| 2019/0045194 A1* | 2/2019 | Zavesky | H04N 19/142 | |
| 2019/0172206 A1* | 6/2019 | Kakishita | G06T 7/0012 | |
| 2019/0183451 A1* | 6/2019 | Yu | G06F 16/258 | |
| 2019/0188534 A1* | 6/2019 | Murrish | G06K 9/6262 | |
| 2019/0228273 A1* | 7/2019 | Merrill | G06N 3/08 | |
| 2019/0272645 A1* | 9/2019 | Huang | G06N 3/08 | |
| 2019/0385307 A1* | 12/2019 | Yaqub | G06T 7/0014 | |
| 2020/0051017 A1* | 2/2020 | Dujmic | G06N 3/08 | |
| 2020/0151922 A1* | 5/2020 | Xu | A61B 6/4085 | |
| 2020/0202140 A1* | 6/2020 | Simon | G06T 7/33 | |
| 2020/0211172 A1* | 7/2020 | Nam | G06T 5/40 | |
| 2020/0314422 A1* | 10/2020 | Saeedi | H04N 19/124 | |
| 2020/0364845 A1* | 11/2020 | Edis | G06F 3/12 | |
| 2020/0405269 A1* | 12/2020 | Swisher | G06N 3/04 | |
| 2021/0055835 A1* | 2/2021 | Andreou | H04N 21/41407 | |

OTHER PUBLICATIONS

Aydin, T.O., et al., "Video Quality Assessment for Computer Graphics Applications," ACM SIGGRAPH Asia (2010).

Benty, N., et al., "The Falcor Rendering Framework," (2017); found at: https://github.com/NVIDIAGameWorks/Falcor.

Li, Z., et al., "Toward a Practical Perceptual Video Quality Metric," (2016). Found at: https://medium.com/netflix-techblog/toward-a-practical-perceptual-video-quality-metric-653f208b9652.

Mantiuk, R., et al., "HDR-VDP-2: A Calibrated Visual Metric for Visibility and Quality Predictions in All Luminance Conditions," ACM Transactions on Graphics 30, 4, Article 40, (Jul. 2011), 14pp.

Nalbach, O., et al., "Deep Shading: Convolutional Neural Networks for Screen Space Shading," Computer Graphics Forum 36, 4 (Jul. 2017), 65-78.

Simonyan, K., et al., "Very Deep Convolutional Networks for Large-Sale Image Recognition," CoRR abs/1409.1556 (2014) arXiv:1449.1556.

Wang, Z., et al., "Image quality assessment: from error visibility to structural similarity," IEEE transactions on image processing 13,4 (2004), 600-612.

Chollet, F., "Keras: The Python Deep Learning Library," (2015); found at https://github.com/fchollet/keras.

Gharbi et al., "Deep Joint Demosaicking and Denoising," ACM Transactions on Graphics, 35(6): 2016, 12 pages.

NVIDIA, "ORCA: Open Research Content Archive," NVIDIA, retrieved from https://developer.nvidia.com/orca, Jul. 2017, 6 pages.

Jimenez et al., "Filtering Approaches for Real-Time Anti-Aliasing," ACM SIGGRAPH Courses, 2011, 14 Pages.

* cited by examiner

DETECTING VISUAL ARTIFACTS IN IMAGE SEQUENCES USING A NEURAL NETWORK MODEL

CLAIM OF PRIORITY

This application claims the benefit of U.S. Provisional Application No. 62/716,750 titled "Detecting Artifacts in Image Sequences Using Deep Neural Networks," filed Aug. 9, 2018, the entire contents of which is incorporated herein by reference.

TECHNICAL FIELD

The present disclosure relates to visual artifacts, and, more specifically, to detecting visual artifacts in image sequences using a neural network.

BACKGROUND

Evaluation of image quality to detect visual artifacts is conventionally performed either manually or by comparing a test image or video against a known ground truth image or video. The former is tedious and expensive, and the latter requires the availability of a high-quality reference corresponding to the test image or video. There is a need for addressing these issues and/or other issues associated with the prior art.

SUMMARY

Motivated by the ability of humans to quickly and accurately detect visual artifacts in images, a neural network model is trained to identify and locate visual artifacts in a sequence of rendered images. Examples of visual artifacts include aliasing, blurriness, mosaicking, and overexposure. The neural network model provides a useful fully-automated tool for evaluating the quality of images produced by rendering systems. The neural network model may be trained to evaluate the quality of images for video processing, encoding, and/or compression techniques. In an embodiment, the sequence includes at least four images corresponding to a video or animation.

A method, computer readable medium, and system are disclosed for receiving a sequence of rendered images. A neural network model processes the sequence of rendered images to produce at least one quality metric for each rendered image, the quality metric indicating presence or absence of a visual artifact in the rendered image.

DETAILED DESCRIPTION

Evaluating image quality is important in computer graphics and, in particular in designing rendering software. Manual assessment by a human can require significant time and effort. Conventional automated assessment often requires the availability of high-quality ground truth (reference) images that do not include visual artifacts to compare against an image produced by a rendering system. In contrast with conventional automated assessment techniques, humans can often detect visual artifacts without comparing a rendered image to a ground truth image. Inspired by the ability of humans to quickly and accurately identify visual artifacts in rendered images, as described further herein, a neural network model is trained to detect rendering artifacts in images and sequences without comparing the images against a ground truth reference image. The neural network model learns to identify patterns in image sequences that indicate undesirable visual artifacts. In the context of the following description, visual artifacts include spatial artifacts as well as spatiotemporal artifacts.

Figure 1A:
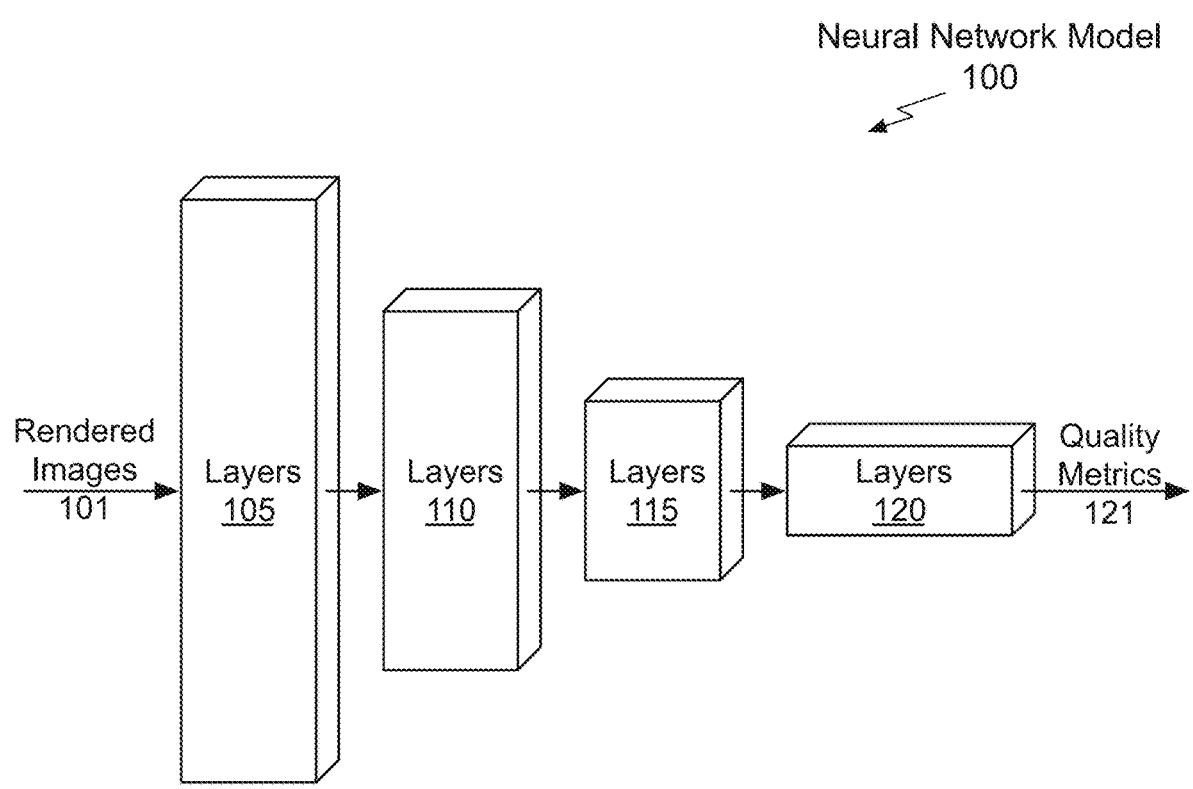
FIG. 1A illustrates a block diagram of a neural network model for detecting artifacts in rendered image sequences, in accordance with an embodiment.

FIG. 1A illustrates a block diagram of a neural network model 100 for detecting artifacts in rendered image sequences, in accordance with an embodiment. The neural network model 100 receives a sequence of rendered images 101 that are processed by layers 105, 110, 115, and 120 to produce quality metrics 121. In an embodiment, the quality metrics 121 include a single bit for an entire rendered image. In an embodiment, the quality metrics 121 include a scalar value for an entire rendered image.

In one embodiment, the architecture of the neural network model 100 is inspired by the Visual Geometry Group (VGG19) network trained for image classification, with modifications to prioritize detecting small-scale artifacts such as aliasing. The neural network model 100 includes two phases: a first phase with multiple groups of convolutions followed by pooling, and a second phase with several fully-connected layers. The first phase includes the layers 105, 110, and 115 and the second phase includes the layers 120.

The layers 105 include multiple blocks, each block including a convolution layer followed by batch normalization and a leaky rectified linear unit (Leaky-ReLU) in series. In an embodiment, 4 blocks process sequences of rendered images including four 64×64 pixel images and an output depth of 128 (channels). The layers 110 includes a first group of layers and a second group of layers, where the first group includes a max pooling layer followed by multiple blocks, each block including a convolution layer, batch normalization, and a leaky ReLU. The second group of layers includes a max pooling layer followed by multiple blocks, each block including a convolution layer, batch normalization, and a leaky ReLU. In an embodiment, the first group of layers performs a 3×3 convolution on 32×32 pixel images with an output depth of 192 and the second group of layers performs a 3×3 convolution on 16×16 pixel images with an output depth of 320. The layers 115 includes a max pooling layer followed by multiple blocks, each block including a convolution layer, batch normalization, and a leaky ReLU. In an embodiment, the layers 115 performs a 3×3 convolution on 8×8 pixel images with an output depth of 576. The layers 120 includes a max pooling layer, a first fully connected layer followed by a leaky ReLU, a second fully connected layer followed by another leaky ReLU, and a final fully connected layer followed by a sigmoid activation operation. In an embodiment, in the layers 120, the first and second fully connected layers each have an output depth of 4096 and the final fully connected layer has a layer depth of 1, producing a single output.

In an embodiment, the modifications compared with the VGG19 architecture include using sequences of 4 RGB format images as inputs to the neural network model 100, where each image is 64×64 pixels. Compared with using 224×224 RGB images, using lower resolution images trades off spatial pixels with temporal pixels, helping to localize detected artifacts to smaller regions, and also enabling the neural network model 100 to use spatiotemporal information in detecting visual artifacts. In an embodiment, the rendered images 101 include more pixels compared with images processed by VGG19. In an embodiment, the sequence is limited to 4 images. In an embodiment, the sequence can include more than 4 images.

Another modification compared with the VGG19 architecture is the inclusion of additional convolutions in one or more of the first high-resolution layers, in an embodiment. Including the additional convolution layers captures the local nature of visual artifacts, and consequently fewer convolution layers are needed in the later low-resolution layers (e.g., layers 115).

In an embodiment, yet another modification compared with the VGG19 architecture is to increase the overall feature counts based on experimental observations. Furthermore, in an embodiment, batch normalization may be used before activation of the output of each convolutional layer, and a leaky ReLU ($\alpha=0.2$) may be used instead of a ReLU for generating layer activations. In an embodiment, increasing the overall feature counts and using batch normalization helps the neural network model 100 achieve lower loss during training as well as during validation. In an embodiment, the neural network model 100 architecture has a total of 70,160,129 trainable parameters. In an embodiment, the final fully connected layer of the neural network model 100 has a single output with sigmoid activation constraining the quality metrics 121 output by the neural network model 100 to be scalars between 0 and 1 to indicate the magnitude of the detected visual artifact. A single quality metric may be computed for the sequence of rendered images 101, for each rendered image in the sequence of rendered images 101, or for one or more pixels in each rendered image in the sequence of rendered images 101.

Although the neural network model 100 is described in the context of processing units, one or more of the units, layers 105, 110, 115, and 120 may be implemented as a program, custom circuitry, or by a combination of custom circuitry and a program. For example, the layers 105 may be implemented by a GPU (graphics processing unit), CPU (central processing unit), or any processor capable of implementing layers of a neural network. Furthermore, persons of ordinary skill in the art will understand that any system that performs the operations of the neural network model 100 is within the scope and spirit of embodiments of the present disclosure.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
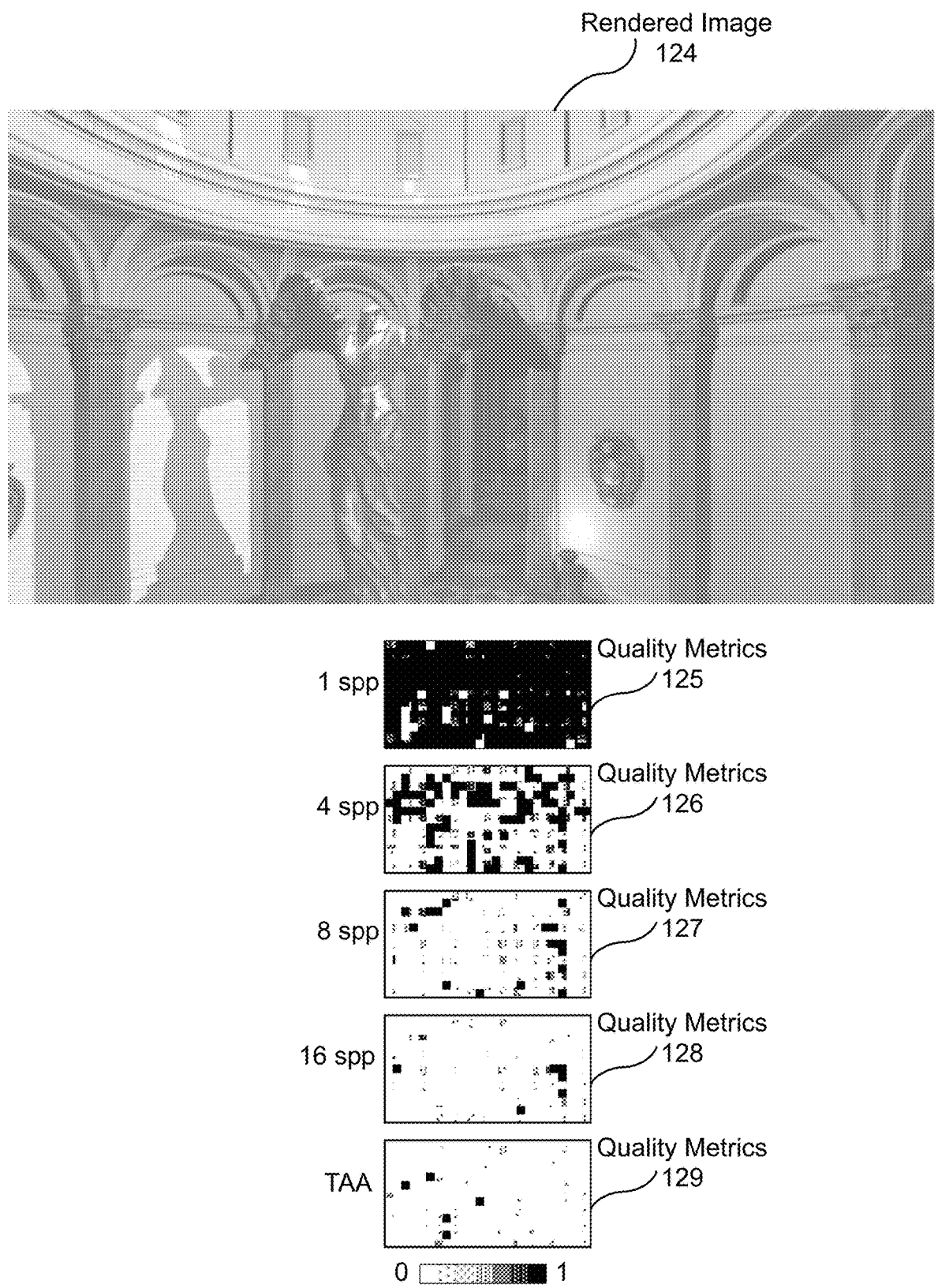
FIG. 1B illustrates a conceptual diagram of the rendered images and generated quality metrics, in accordance with an embodiment.

FIG. 1B illustrates a conceptual diagram of a rendered image 124 and generated quality metrics, in accordance with an embodiment. Each rendered image 124 may be divided into multiple regions and a quality metric may be generated for each region. The quality metrics 125, 126, 127, 128, and 129 are generated for a 64×64 pixel tile region and are scalar values that indicate the severity of aliasing artifacts. The quality metrics 125, 126, 127, 128, and 129 correspond to the rendered image 124, rendered at different sampling rates: 1 sample per pixel (spp), 4 spp, 8 spp, 16 spp, and temporal antialiasing (TAA), respectively. As the number of samples per pixel increases from 1 spp to 16 spp, thereby increasing the quality of the rendered images, the severity (or degree) of the detected artifacts decreases.

At 1 sample per pixel, the neural network model 100 detects most tiles as being aliased, while at 16 samples per pixel, the neural network model 100 detects very few tiles as containing aliasing artifacts. The neural network model 100 also detects very few aliased tiles for image sequences that are antialiased using temporal antialiasing (TAA), which is the current state-of-art algorithm for high-quality antialiasing in contemporary modern video games. Because TAA is known to produce blurred images, conventional image quality metrics tend to report a high difference for the rendered image 124 when compared against a ground truth (reference) image.

A training dataset that is used to train the neural network model 100 includes a variety of rendered image sequences with and without visual artifacts, where each rendered image sequence is paired with computed ground truth quality metrics. In an embodiment, the neural network model 100 is trained with a training dataset that does not include any sequences of rendered images that include TAA images to produce the quality metrics 129 that is similar to the quality metrics 128 for 16 spp.

TABLE 1 shows the quality metrics 121 generated by the neural network model 100 averaged for the rendered images 101, for different pixel sampling rates. TABLE 1 also shows quality measurements using the conventional techniques perceptually-based Structural Similarity (SSIM) and Peak Signal-to-Noise Ratio (PSNR) for an image sequence rendered for the different pixel sampling rates. Specifically, the image sequence includes the rendered image 124 and 3 preceding frames, each rendered at 16 spp. SSIM and PSNR require a comparison with the ground truth image, whereas the quality metrics 121 are generated without using the ground truth image.

TABLE 1

Quality measurements for different pixel sampling rates

| Image Source | Quality Metrics | SSIM | PSNR |
| --- | --- | --- | --- |
| 1 spp | 0.8822 | 0.9709 | 30.87 |
| 4 spp | 0.5012 | 0.9915 | 36.68 |
| 8 spp | 0.1697 | 0.9966 | 41.67 |
| 16 spp | 0.0787 | 1.0000 | — |
| TAA | 0.0572 | 0.9269 | 29.32 |

As expected, the average of the quality metrics 121 is close to 1 for 1 spp rendered images 101 and reduces to less than 0.1 for 16 spp rendered images 101. Because aliasing is the dominant artifact in the rendered images, the quality metrics 121 generated by the neural network model 100 are consistent with SSIM. The average of the quality metrics 121 is similarly less than 0.1 for TAA rendered images 101. However, TABLE 1 shows that the average of the quality metrics 121 does not correlate well with SSIM or PSNR when other artifacts are present. For instance, outputs of temporal antialiasing (TAA) have low SSIM and PSNR values (compared with other values for SSI and PSNR) because TAA tends to trade off image sharpness for antialiasing. The quality metrics 121 generated by the neural network model 100 only measure aliasing and hence provide a similar output for TAA images and 16 spp images, even though the former is significantly less sharp. In this respect, the neural network model 100 is more useful than the conventional image quality measurement techniques when the purpose is to identify aliasing artifacts in an image sequence.

The neural network model 100 is able to identify aliasing artifacts in isolation, even when other artifacts are present in the rendered images 101, correctly reporting TAA rendered images as low aliasing. Unlike the SSIM and PSNR techniques, the neural network model 100 receives only a sequence of rendered images and does not require a reference image that is artifact-free to generate a quality metric indicating presence or absence of a visual artifact in each one of the rendered images. The neural network model 100 may be trained to detect a specific type of visual artifact and ignore other types of visual artifacts. For example, the neural network model 100 may detect aliasing artifacts while ignoring blurring artifacts caused by temporal antialiasing (TAA). In an embodiment, the neural network model 100 is trained to detect multiple types of visual artifacts. Example types of visual artifacts include aliasing, blurriness, compression artifacts, de-noising artifacts, mosaicking, and overexposure. Furthermore, the neural network model 100 may be used as a loss function to train another image or video processing neural network model. More specifically, the neural network model 100 may be used as a discriminator in a generative adversarial neural network system (e.g., GAN).

Figure 1C:
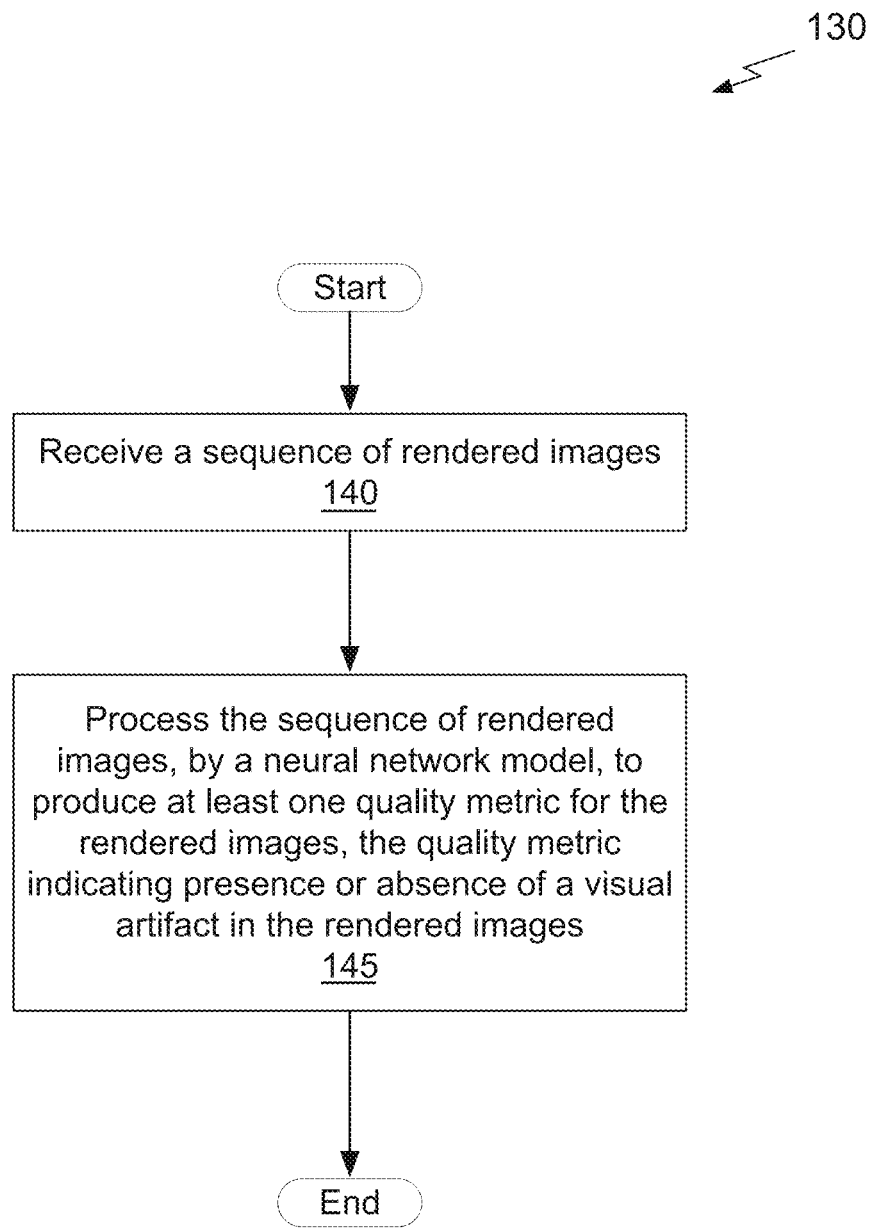
FIG. 1C illustrates a flowchart of a method to detect visual artifacts in rendered image sequences, in accordance with an embodiment.

FIG. 1C illustrates a flowchart of a method 130 to detect visual artifacts in rendered image sequences, in accordance with an embodiment. Although method 130 is described in the context of a processing unit, the method 130 may also be performed by a program, custom circuitry, or by a combination of custom circuitry and a program. For example, the method 130 may be executed by a GPU (graphics processing unit), CPU (central processing unit), or any processor capable of implementing a neural network model, such as the neural network model 100. Furthermore, persons of ordinary skill in the art will understand that any system that performs method 120 is within the scope and spirit of embodiments of the present disclosure.

At step 140, the neural network model 100 receives a sequence of rendered images 101. In an embodiment, the sequence of rendered images 101 includes at least four rendered images. At least a portion of the rendered images 101 may include one or more visual artifacts of at least one type. In an embodiment, the neural network model 100 is trained to detect a first type of visual artifact while ignoring a second type of visual artifact. In an embodiment, the neural network model 100 is trained to detect both the first and second types of visual artifacts.

At step 145, the neural network model 100 processes the sequence of rendered images 101 to produce at least one quality metric for the rendered images 101, where the quality metric indicates presence or absence of a visual artifact in the rendered images 101. In an embodiment, a single quality metric is produced for an entire rendered image. In an embodiment, each image in the sequence of rendered images 101 is divided into multiple regions called tiles. A tile may be a single pixel or multiple pixels that are adjacent or distributed across the image. In an embodiment, the tiles are 64×64 pixel regions. In an embodiment, the same tile for each image in the sequence of rendered images 101 is processed by the neural network model 100, before a different tile is processed by the neural network model 100 to detect visual artifacts. Alternatively, two or more tiles may be processed in parallel by separate neural network models 100.

Figure 1D:
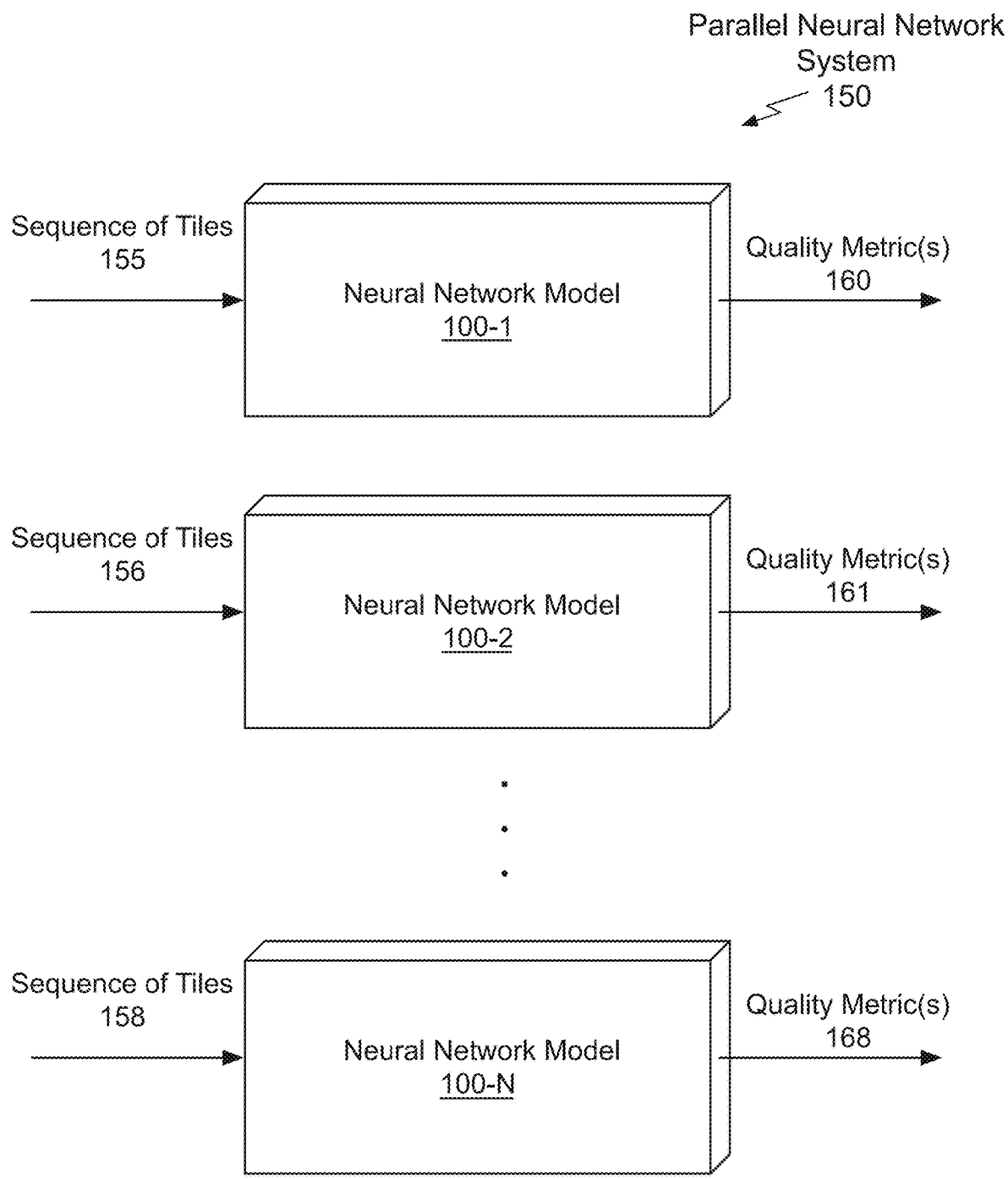
FIG. 1D illustrates a block diagram of a parallel neural network system for detecting artifacts in rendered image sequences, in accordance with an embodiment.

FIG. 1D illustrates a block diagram of a parallel neural network system 150 for detecting artifacts in rendered image sequences, in accordance with an embodiment. The parallel neural network system 150 includes N instances of the neural network model 100. The rendered images 101 are each divided into tiles, resulting in sequences of tiles. In an embodiment, N equals the total number of tiles included in each image. In an embodiment, N is less than the total number of tiles included in each image.

Each neural network model 100-1, 100-2, . . . 100-N receives a separate portion of the tiles for the rendered images 101. The neural network model 100-1 receives a first portion of the tiles, including a sequence of tiles 155 for a first tile. The neural network model 100-1 processes the sequence of tiles 155 to produce to produce quality metric(s) 160 for the first tile of the rendered images 101. In an embodiment, a single quality metric 160 is produced for each tile in the sequence of tiles 155. In an embodiment, the first portion of the tiles includes at least one other tile in addition to the first tile. When more than one tile is included in the first portion, the neural network model 100-1 processes the first tile for the entire sequence before processing the second tile for the entire sequence.

The neural network model 100-2 receives a second portion of the tiles, including a sequence of tiles 156 for a second tile. The neural network model 100-2 processes the sequence of tiles 156 to produce to produce quality metric(s) 161 for the second tile of the rendered images 101. The neural network model 100-N receives an Nth portion of the tiles, including a sequence of tiles 158 for an Nth tile. The neural network model 100-N processes the sequence of tiles 158 to produce quality metric(s) 168 for the Nth tile of the rendered images 101. When N is less than the total number of tiles, unprocessed sequences of tiles are provided to one of the neural network models 100-1, 100-2, . . . 100-N until all of the sequences of tiles are processed. In an embodiment, the neural network models 100-1, 100-2, . . . 100-N process the sequences of tiles 155, 156, . . . 158 simultaneously to produce the quality metric(s) 160, 161, . . . 168 in parallel. After a first sequence of images is processed by the parallel neural network system 150, a first sequence of images that is divided into tiles may be processed.

The combined quality metric(s) 160, 161, . . . 168 for the rendered images 101, roughly indicates the magnitude of detected visual artifacts across a rendered image, such as the rendered image 124 of FIG. 1B. For example, the combined quality metric(s) 160, 161, . . . 168 may be one of the quality metrics 125, 126, 127, 128, and 129. The quality metric(s) 160, 161, . . . 168 may be used to locate regions in the rendered image 124 where visual artifacts are detected. In an embodiment the average of the quality metric(s) 160, 161, . . . 168 computed across the rendered image 124 are used as an overall measure of visual artifacts in the rendered image 124.

In an embodiment, the neural network model 100 is trained in a supervised fashion to detect a type of visual artifact in a sequence of rendered images by processing, via the neural network model 100, rendered images that include the type of visual artifact as well as rendered images that do not include the type of visual artifact. The ground truth quality metric (e.g., target output) is set to 1 (e.g., True) for rendered images that include the type of visual artifacts and 0 (e.g., False) for rendered images that do not include the type of visual artifacts. In other embodiments, the ground truth quality metric is set to different values, such as different scalar values, depending on the presence or not of the type of visual artifact and the magnitude of the detected visual artifact.

Figure 2A:
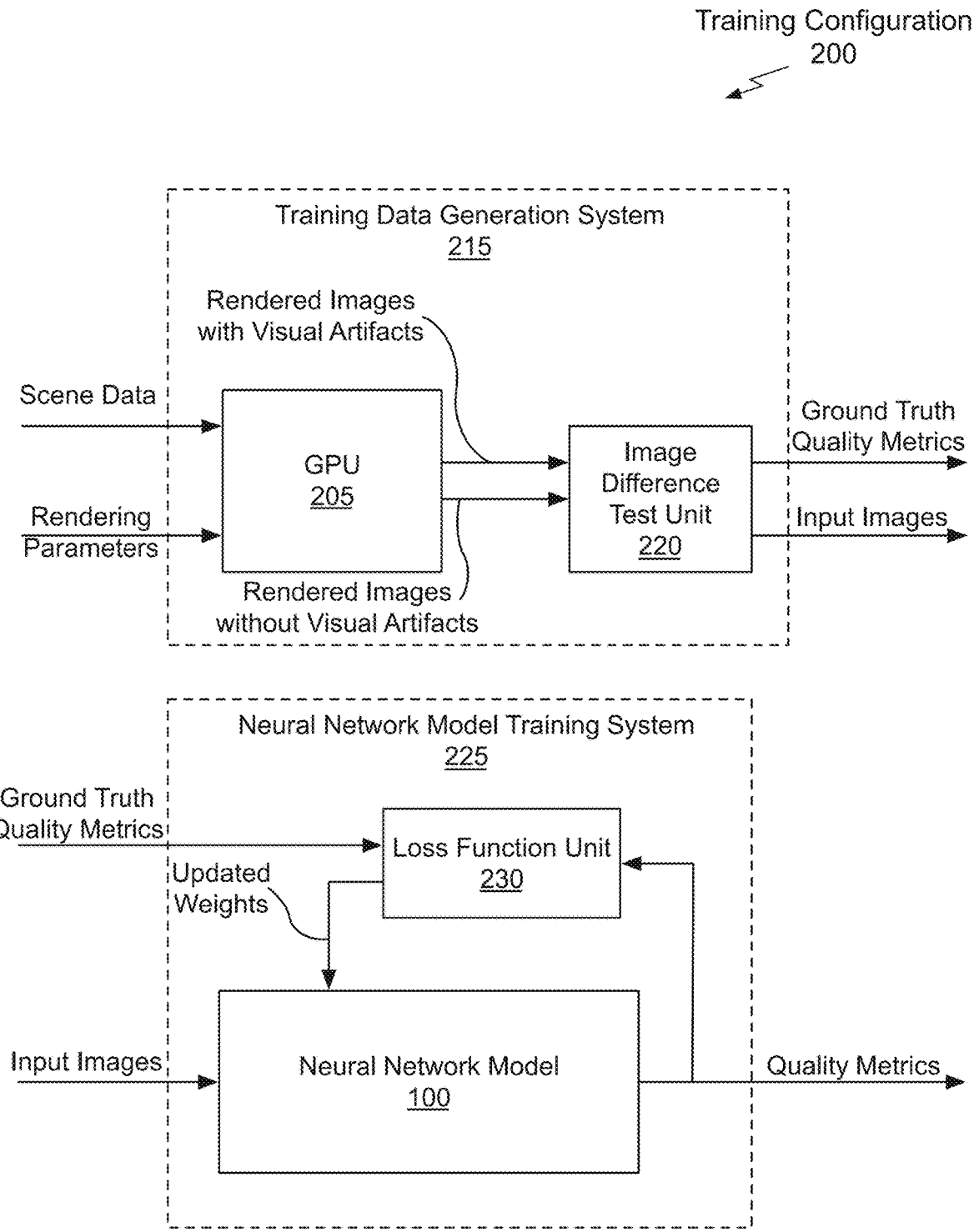
FIG. 2A illustrates a block diagram of a training configuration, in accordance with an embodiment.

FIG. 2A illustrates a block diagram of a training configuration 200, in accordance with an embodiment. The training configuration 200 includes a training data generation system 215 and a neural network model training system 225. The training data generation system 215 includes a graphics processing unit (GPU) 205 and an image difference threshold test unit 220. The neural network model training system 225 includes the neural network model 100 and a loss function unit 230. The training data generation system 215 outputs a training dataset including pairs of input images and corresponding ground truth quality metrics. The input images include sequences, where each sequence may include a combination of rendered images with visual artifacts and rendered images without visual artifacts. Although, rendered images without visual artifacts (reference images) are not needed during inferencing, the rendered images without visual artifacts are needed to train the neural network model 100 to detect visual artifacts.

Figure 3:
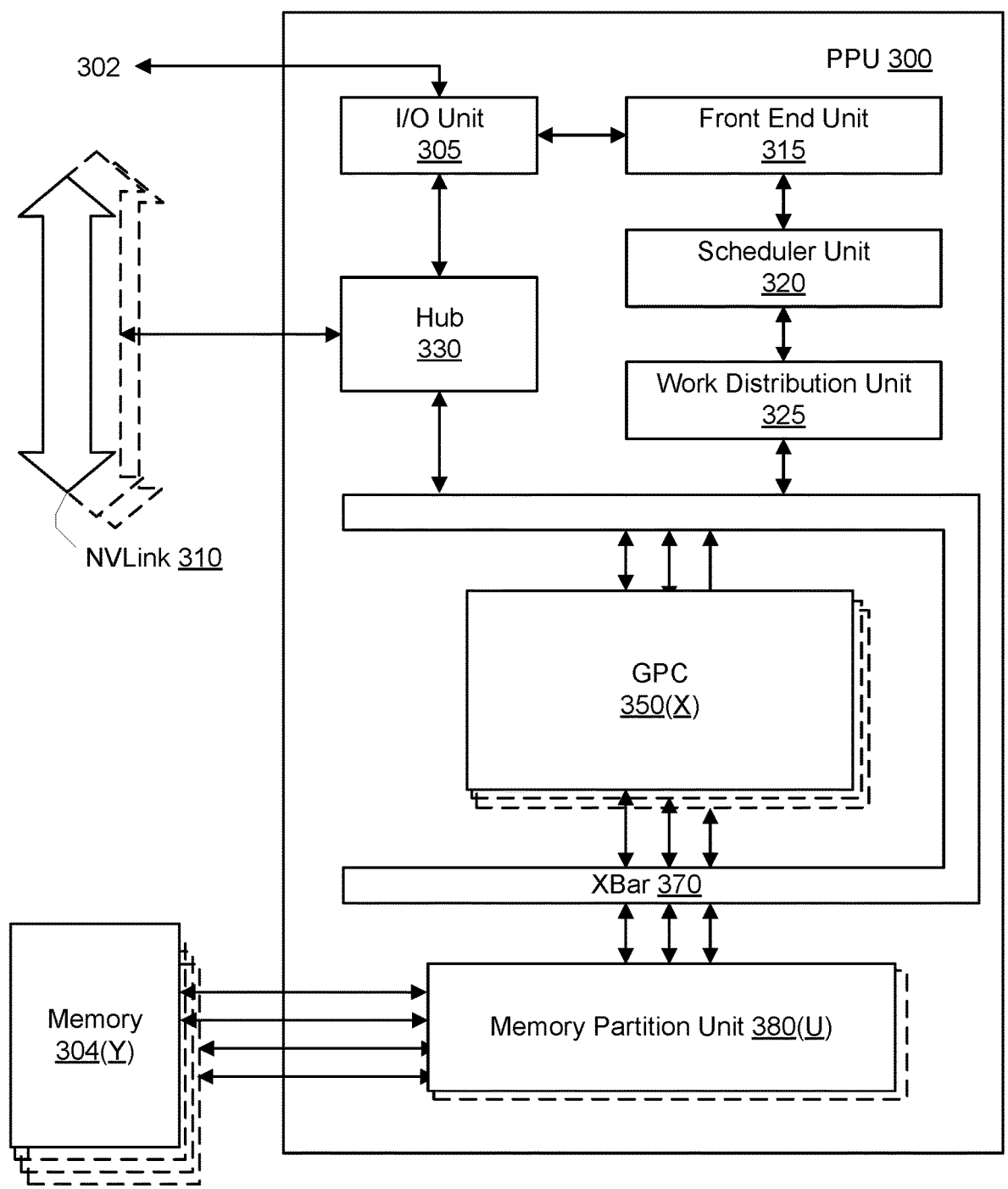
FIG. 3 illustrates a parallel processing unit, in accordance with an embodiment.

Although the training configuration system 200 is described in the context of processing units, one or more of the GPU 205, the image difference test unit 220, and the loss function unit 230 may be performed by a program, custom circuitry, or by a combination of custom circuitry and a program. In an embodiment, parallel processing unit (PPU) 300 of FIG. 3 is configured to implement the training data generation system 215. Furthermore, persons of ordinary skill in the art will understand that any system that performs the operations of the training configuration 200 is within the scope and spirit of embodiments of the present disclosure.

To generate the training data, the GPU 205 receives scene data and rendering parameters. The GPU 205 processes a virtual scene defined by the scene data according to the rendering parameters to either generate rendered image (sequences) without visual artifacts and/or to generate rendered image (sequences) with one or more visual artifacts. The rendering parameters may specify the type of visual artifacts to be introduced during rendering. In an embodiment, the rendering parameters specify more than one type of visual artifact.

To add variety during the training, the rendering parameters may be varied to augment the rendered images with random permutations. Specifically, in an embodiment, sequences of rendered images are randomly flipped along the time, height, and width axes with a probability of 0.1 each, and the brightness and contrast of the rendered image sequence is scaled to between 0.6 and 1.4. In an embodiment, to produce a training dataset for detecting aliasing artifacts, for each of the rendered image sequences, 1 sample-per-pixel (1 spp) rendering is specified by the rendering parameters to produce the input images with artifacts, and 16 or 64 sample-per-pixel super-sampled rendering is specified by the rendering parameters to produce the input images without artifacts. For scenes with simple content, 16 spp renderings may be sufficient to provide stable anti-aliased images. For scenes with more complicated content 64 spp renderings may be needed to fully eliminate aliasing.

In an embodiment, several animated sequences of 25 frames are rendered and the first 4 images of each sequence are extracted and provided to the image difference test unit 220 to produce the input images for the training dataset, thereby providing a diverse database of short animated sequences. In an embodiment, each sequence of input images is randomly cropped to produce a sequence of 64×64 pixel input images for processing by the neural network model training system 225.

A key requirement of the rendered images with visual artifacts is that the sequences must contain visible visual artifacts. The rendering process does not guarantee visual artifacts will be visible in the rendered images. For example, there may be image regions that are entirely covered by low frequency effects (e.g. sky) or texture maps (e.g. flat surfaces). To ensure that rendered images with visual artifacts that are not visible are not identified as including visual artifacts, the image difference test unit 220 receives the rendered images with and without the visual artifacts and ensures that the rendered images with visual artifacts are sufficiently different compared with the rendered images without visual artifacts.

To ensure that the visual artifacts in the rendered images with visual artifacts should be detected (based on the severity of the visual artifacts), the image difference test unit 220 compares each rendered image with visual artifacts with the corresponding rendered image without visual artifacts (reference) to compute a difference and discards any rendered images with visual artifacts having a difference that are less than a threshold value. The comparison ensures that the rendered images with visual artifacts are sufficiently different compared with the corresponding rendered images without visual artifacts. The threshold value may be predetermined or programmed and may be used to control the severity of the visual artifacts that the neural network model 100 is trained to detect.

In an embodiment, the difference is computed using $\mathcal{L}_1$ or $\mathcal{L}_2$ normalization functions. In an embodiment, the difference is computed using the SSIM (lower values indicate greater differences). In an embodiment, the threshold value is set to 0.97, so that rendered images with visual artifacts having a difference less than 0.97 compared with the corresponding rendered images without visual artifacts have the quality metrics set to 1, indicating a visual artifact is present. Otherwise, the quality metrics are set to 0, indicating a visual artifact is not present, even though the rendered image sequence was generated by the GPU 205 to include visual artifacts. The image difference threshold test unit 220 computes the ground truth quality metrics for the rendered images that are not discarded.

When the training dataset is intended to include a specific distribution of rendered images with and without artifacts, removing one or more of the rendered images with visual artifacts unbalances the training dataset, resulting in far more input images without visual artifacts than input images with visual artifacts. To ensure that the input images with visual artifacts having quality metrics indicating the visual artifacts are present are considered equally, during training, the loss by which the input images with visual artifacts are weighted may be increased compared with the loss by which the input images without visual artifacts are weighted. In an embodiment, a running count of the quality metrics indicating visual artifacts are detected or not detected is used to compute the weights.

In an embodiment, the input difference test unit 220 is configured to perform random permutations on the rendered images (with and/or without visual artifacts) to produce the input images. The training dataset generated by the training data generation system 215 may be used to train the neural network model 100 to detect one or more types of visual artifacts in input image sequences.

In addition to the neural network model 100, the neural network model training system 225 includes the loss function unit 230. During training, the input images for test pairs included in the training dataset are processed, according to weights, by the neural network model 100 to generate quality metrics. The quality metrics output by the neural network model 100 and the ground truth quality metrics for the test pairs are processed by the loss function unit 230 to compute difference values. The loss function unit 220 backpropagates the difference values through the neural network model 100 and generates updated layer parameters (e.g., weights) to reduce differences between the quality metrics and the ground truth quality metrics. The loss function unit 220 provides the updated weights to the neural network model 100. When the differences are reduced to a predetermined value, training is complete.

In an embodiment, when the quality metrics are binary values of either 0 or 1, binary cross entropy is used as the loss function implemented by the loss function unit 230. In an embodiment, the loss function unit 230 performs Stochastic Gradient Descent (SGD) with a learning rate of 0.001 and no decay as an optimizer function to minimize the differences. To help improve generalization, batch normalization may be performed between each convolution layer and associated activation in one or more of the layers 105, 110, and 115, and dropout with a probability of 0.2 may be included after each of the first two fully connected layers in the layers 120.

In an embodiment, during training, each sequence of input images is randomly cropped into a 64×64 tile for processing by the neural network model training system 225. In an embodiment, the training dataset includes a subsets of input image sequence/ground truth quality metric pairs, where a first subset includes input images with visual artifacts and a second subset includes input images without visual artifacts. In another embodiment, a third subset includes input images with visual artifacts of a different type. Each sequence of input image sequence/ground truth quality metric pairs in a batch is randomly selected from either the first or second subsets of the training dataset for input to the neural network model 100.

Figure 2B:
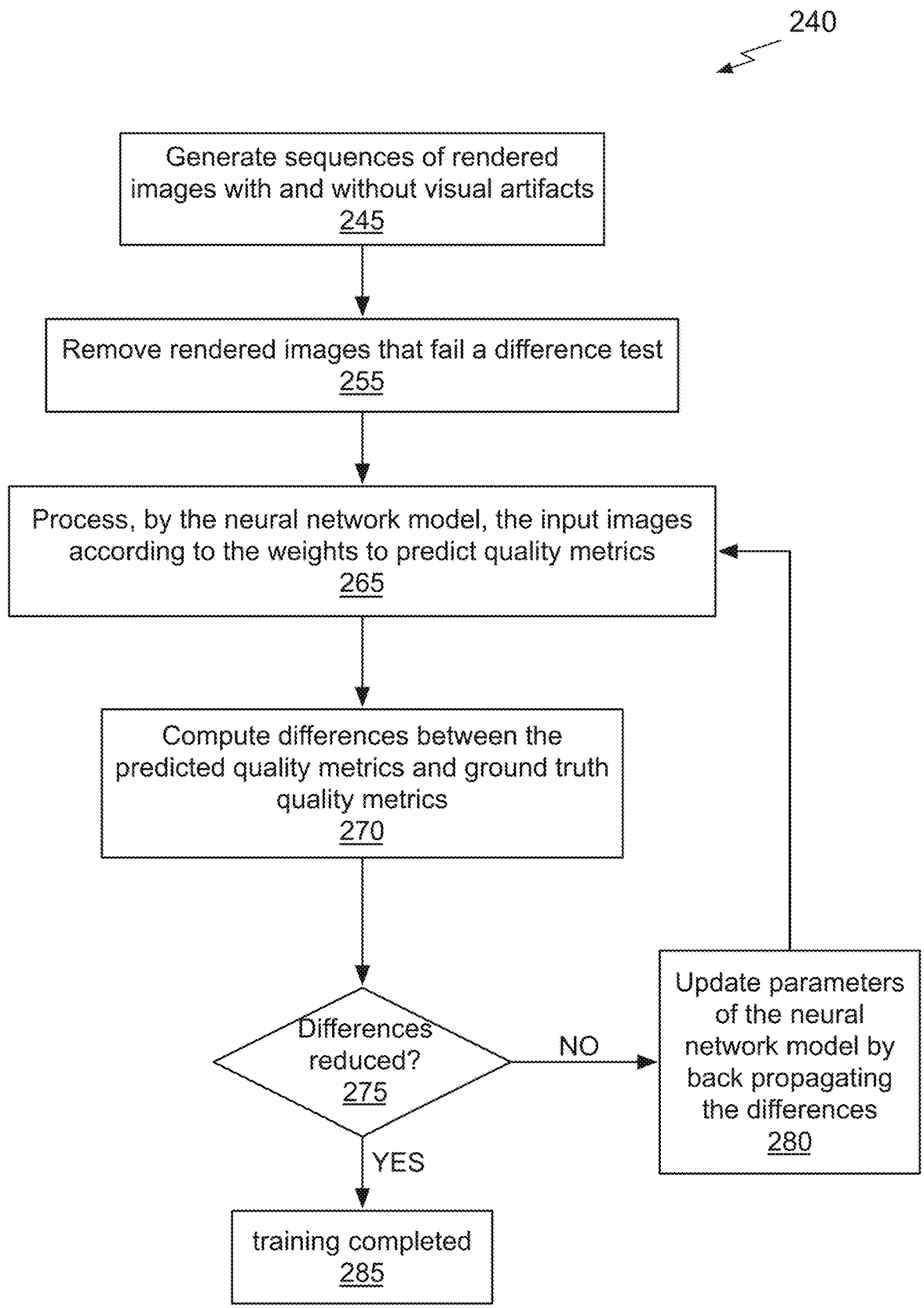
FIG. 2B illustrates a flowchart of a method for training the neural network model of FIG. 1A, in accordance with an embodiment.

FIG. 2B illustrates a flowchart of a method 240 for training the neural network system 100 of FIG. 1B, in accordance with an embodiment. Although method 240 is described in the context of a processing unit, the method 240 may also be performed by a program, custom circuitry, or by a combination of custom circuitry and a program. For example, the method 240 may be executed by a GPU (graphics processing unit), CPU (central processing unit), or any processor capable of implementing training configuration for a neural network model, such as the neural network model 100. Furthermore, persons of ordinary skill in the art will understand that any system that performs method 240 is within the scope and spirit of embodiments of the present disclosure.

At step 245, the training data generation system 215 produces sequences of rendered images with and without visual artifacts. At step 225, the training data generation system 215 removes rendered images that fail a difference test to produce input images. In an embodiment, the sequences of rendered images are generated by the training data generation system 215 during training and the input images are provided directly to the neural network model training system 225. In an embodiment, the sequences of rendered images are generated earlier and are provided to the neural network model training system 225.

At step 265, the input images are processed by the neural network model 100, according to the weights, to predict quality metrics. At step 270, the loss function unit 230 computes differences between the predicted quality metrics output by the neural network model 100 and the ground truth quality metrics. At step 275, the loss function unit 230 determines if the differences are reduced below a predetermined value, and, if so, at step 285 the training is completed. Otherwise, at step 280, the loss function unit 230 updates the parameters of the neural network system 100 to minimize losses based on differences between the predicted quality metrics output by the neural network model 100 and the ground truth quality metrics. In an embodiment, at step 275, the loss function unit 230 determines training is complete when a predetermined number of training iterations (e.g., 1000 epochs) have been performed.

After training, the neural network model 100 may be deployed to detect visual artifacts and evaluate image quality. In an embodiment, multiple neural network models 100 are trained and configured in the parallel neural network system 150.

Figure 2C:
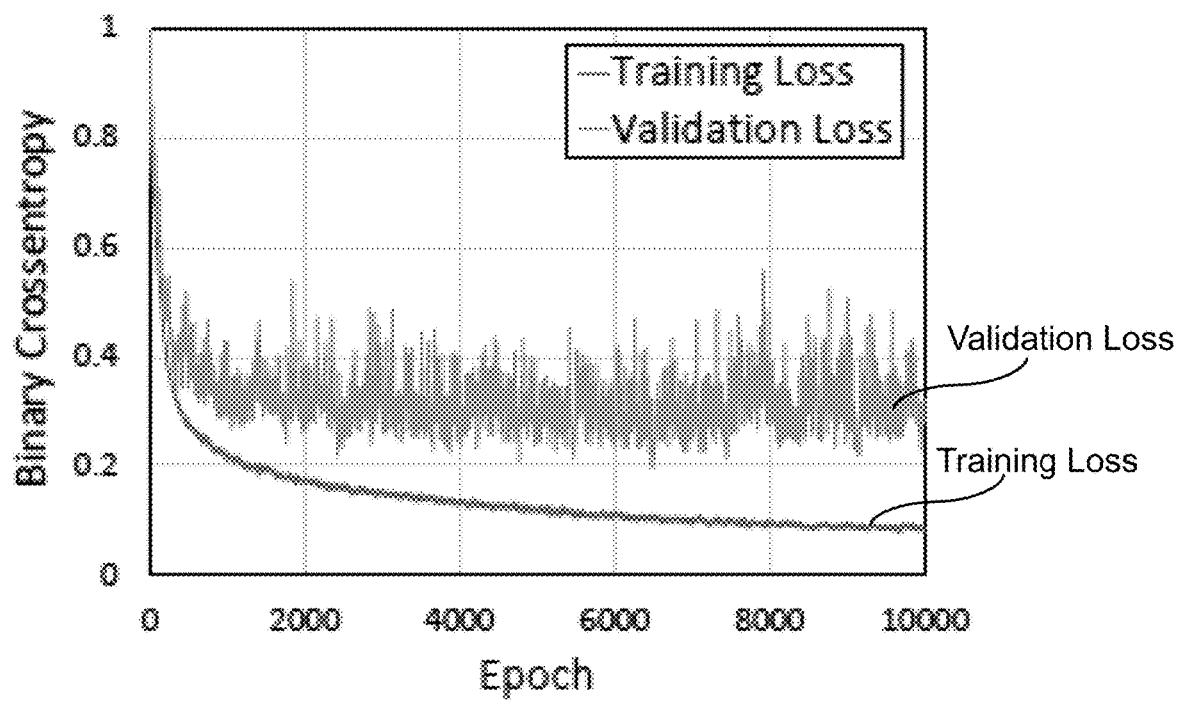
FIG. 2C illustrates graphs of training loss and validation loss, in accordance with an embodiment.
Figure 2C:
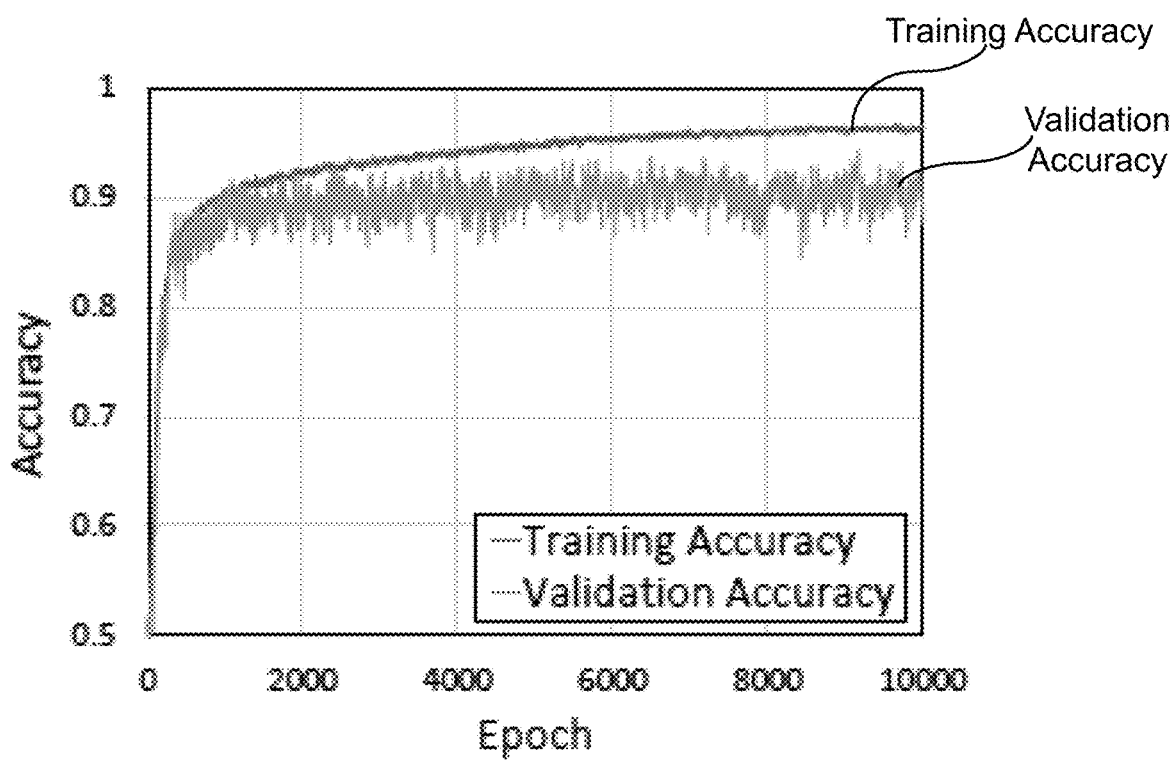

FIG. 2C illustrates graphs of training loss and validation loss, in accordance with an embodiment. FIG. 2C illustrates how the training loss evolves over the training process and how the accuracy of visual artifact classification evolves, as indicated by the validation loss. Good inferencing results are achieved after approximately 1000 epochs, but the training loss continues to improve after even after 1000 epochs. The validation losses do not improve much beyond 3000 epochs.

The neural network model 100 may be used as a tool for analyzing image quality of rendered images or recorded real-life images/videos. Importantly, the neural network model 100 may be trained so that when deployed, the neural network model 100 can identify visual quality artifacts in images without comparing the rendered images with ground truth or reference images. Specifically, the trained neural network model 100 can detect visual artifacts in input image sequences. The neural network model 100 is easy to train by simply showing examples of images containing the chosen visual artifacts as well as images that are free from the chosen visual artifacts. Second, the output of the neural network model 100 is well correlated with the magnitude of the visual artifacts that the neural network model 100 is trained to detect, as well as with conventional metrics when only one type of visual artifact is present. The neural network model 100 learns to effectively ignore other visual artifacts present in the rendered images, which is useful for selective measurement of image quality.

Parallel Processing Architecture

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
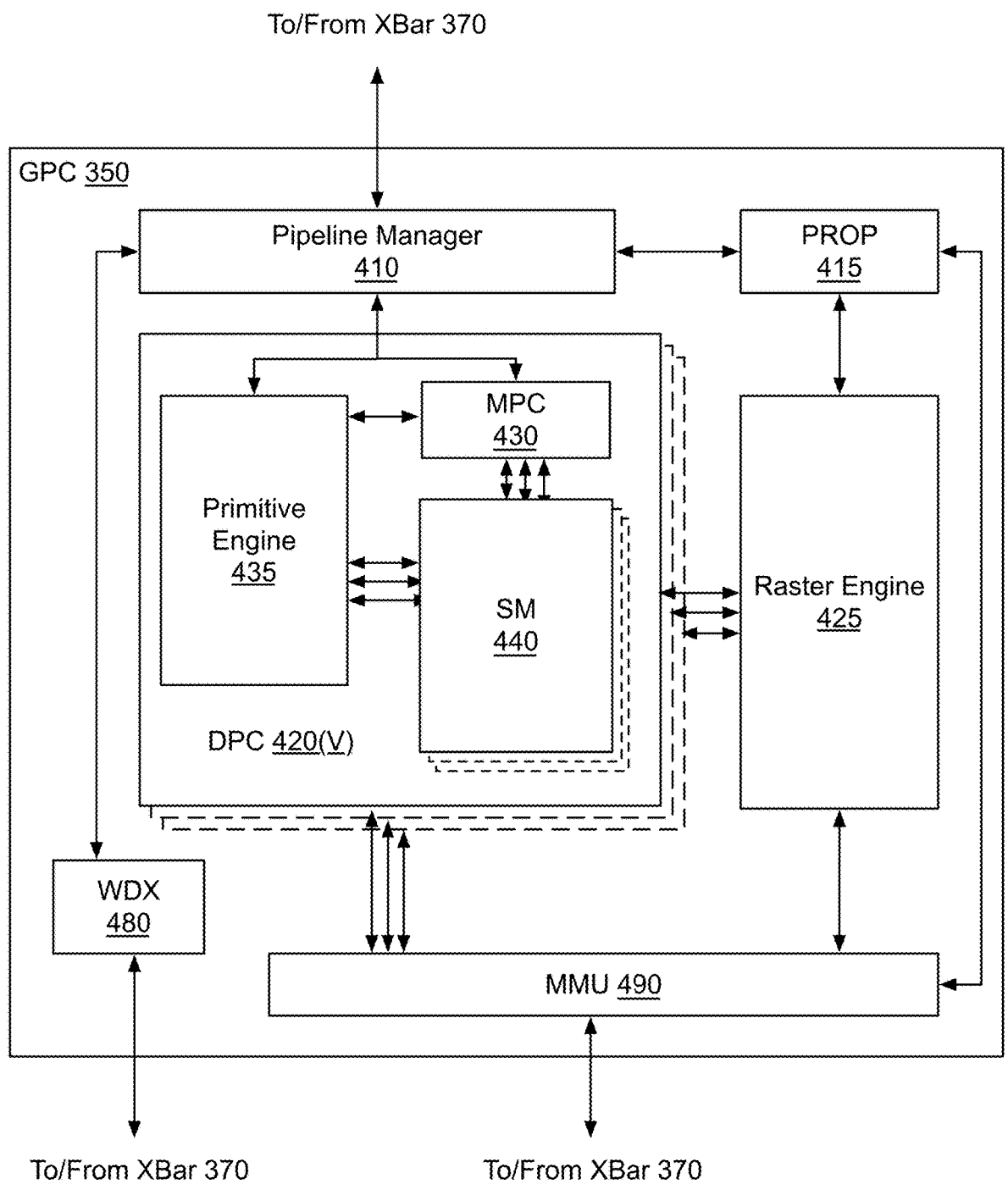
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
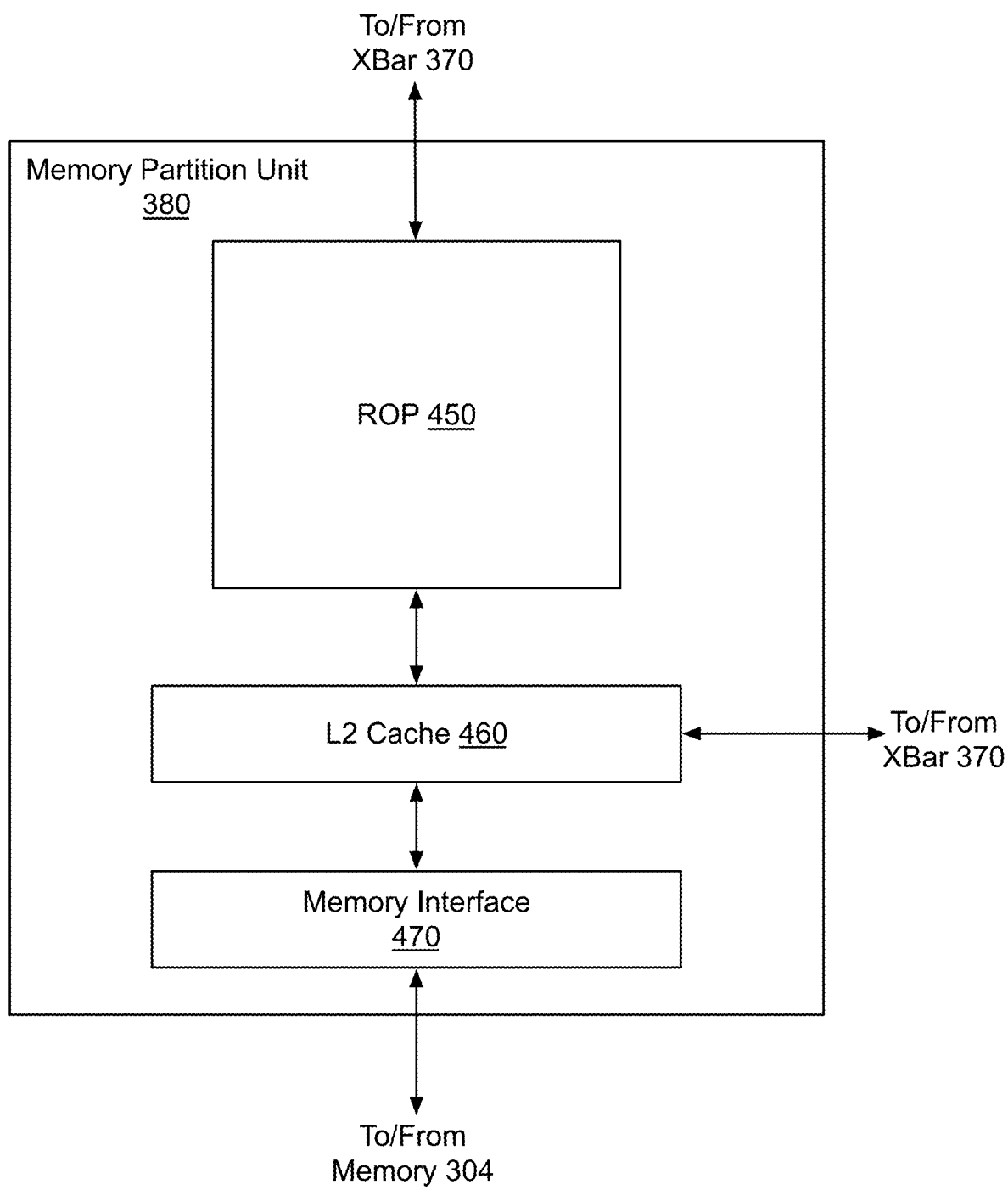
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
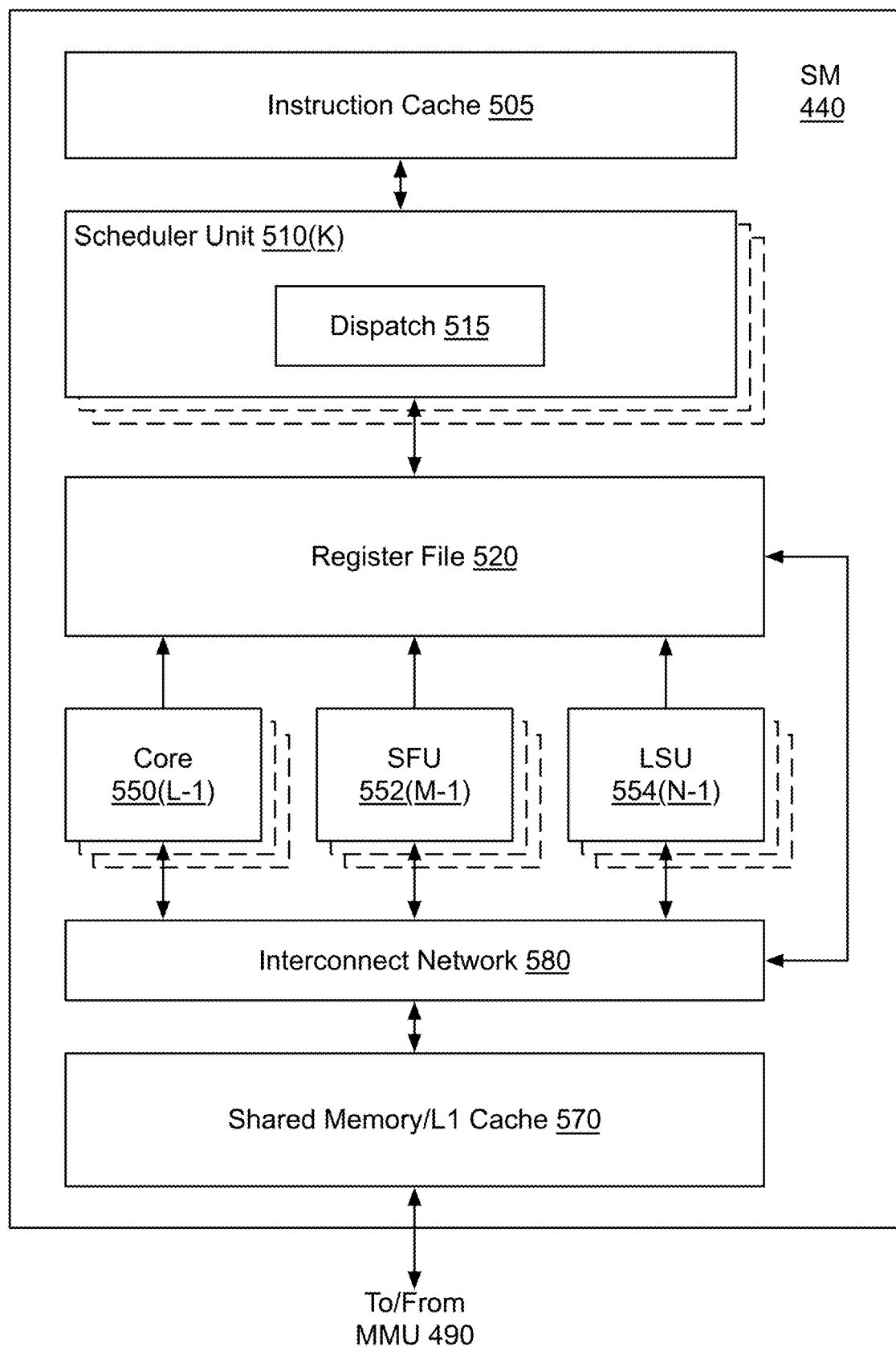
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads.

The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
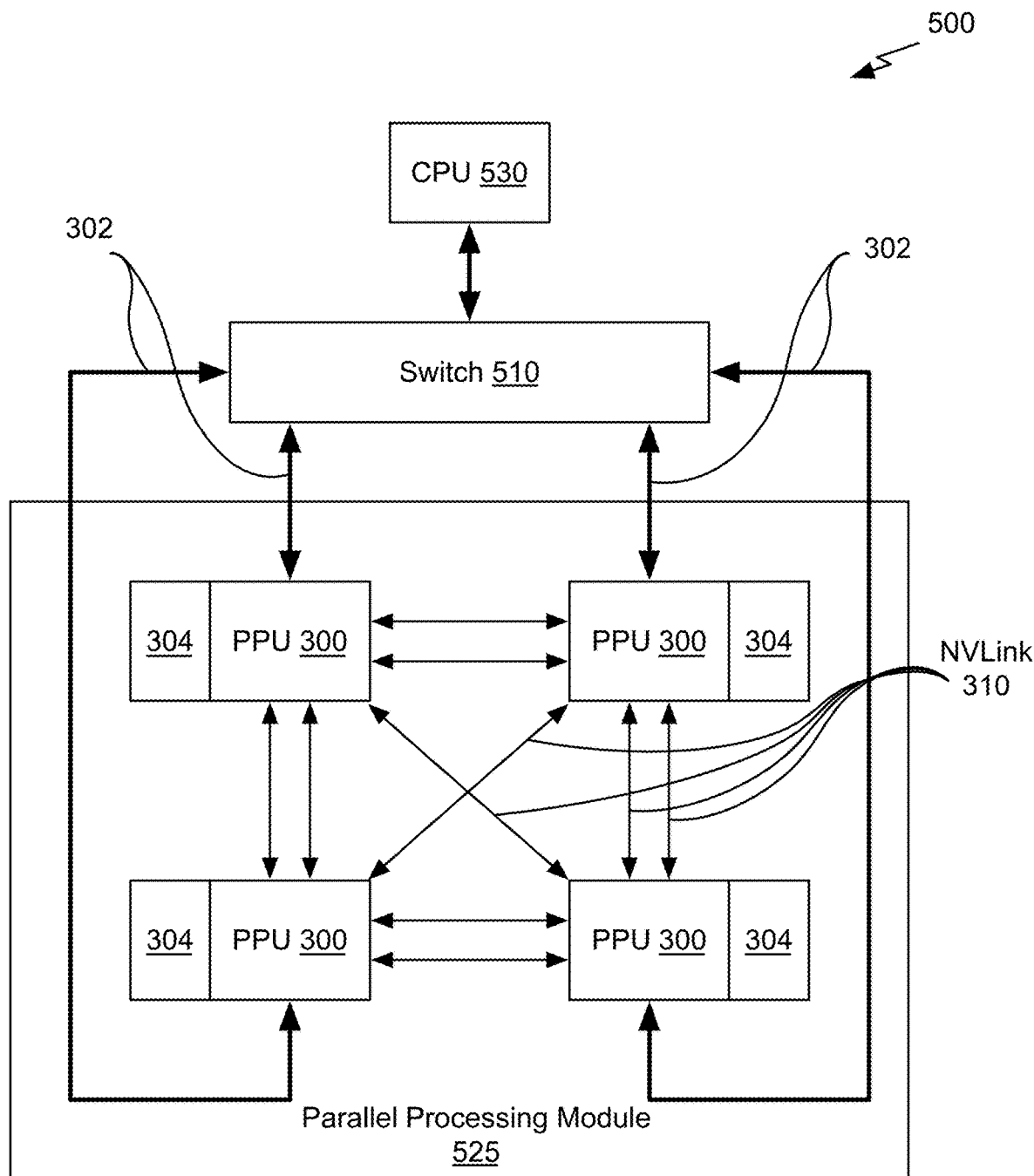
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the methods 130 and 240 shown in FIGS. 1C and/or 2B, respectively. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
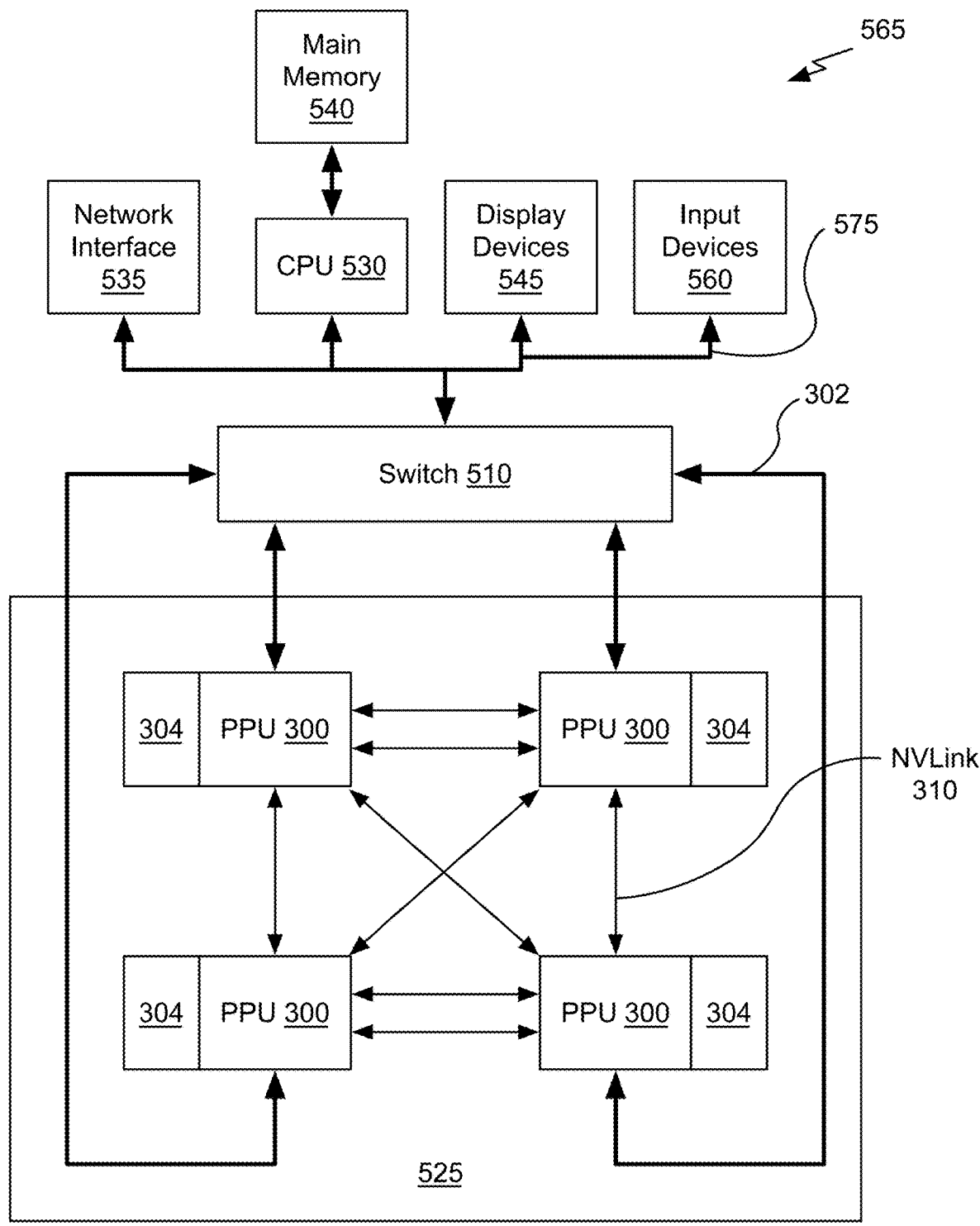
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the methods 130 and 240 shown in FIGS. 1C and/or 2B, respectively.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
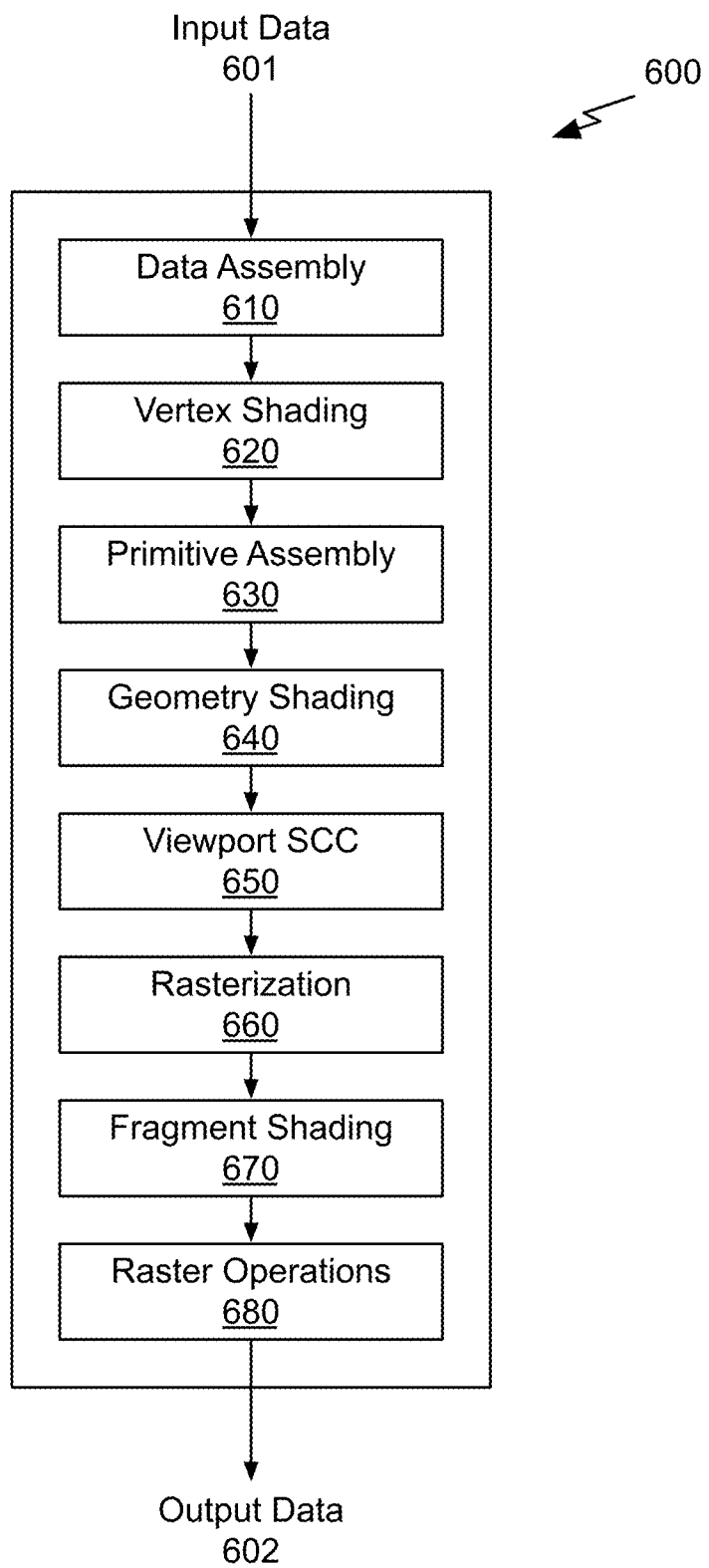
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
receiving a sequence of rendered images;
processing the sequence of rendered images, by a neural network model, to produce at least one quality metric for the sequence of rendered images, each quality metric indicating presence or absence of a visual artifact in the sequence of rendered images; and dividing a first rendered image of the sequence of rendered images into a number of regions including at least a first region and a second region, wherein each region in the number of regions corresponds with a single pixel, and wherein the at least one quality metric includes at least one bit for each region.

2. The computer-implemented method of claim 1, wherein processing the first rendered image comprises processing the regions in parallel to produce the at least one quality metric.

3. The computer-implemented method of claim 1, further comprising:
dividing each rendered image in the sequence of rendered images into a number of regions including at least a first region and a second region, wherein the processing comprises processing the first region of each rendered image by the neural network model to produce a first quality metric of the at least one quality metric for each rendered image.

4. The computer-implemented method of claim 3, wherein the processing further comprises processing the second region of each rendered image to produce a second quality metric of the at least one quality metric for each rendered image.

5. The computer-implemented method of claim 4, wherein the second region is processed by a second neural network model in parallel with the processing of the first region by the neural network model.

6. The computer-implemented method of claim 4, wherein the first quality metric indicates a first type of visual artifact is present in the first region of a first rendered image and the second quality metric indicates a second type of visual artifact is present in the second region of the first rendered image.

7. The computer-implemented method of claim 1, wherein the neural network model detects when a first type of artifact is present in the sequence of rendered images and ignores the presence of a second type of artifact in the sequence of rendered images.

8. The computer-implemented method of claim 1, wherein the sequence of rendered images includes at least four rendered images.

9. The computer-implemented method of claim 1, wherein the quality metric indicates a severity of the visual artifact.

10. The computer-implemented method of claim 1, wherein the visual artifact includes an aliasing artifact.

11. The computer-implemented method of claim 1, wherein the visual artifact includes a data compression artifact.

12. The computer-implemented method of claim 1, wherein the visual artifact includes a de-noising artifact.

13. The computer-implemented method of claim 1, wherein the visual artifact includes an overexposure artifact.

14. The computer-implemented method of claim 1, wherein the neural network model is trained to detect a first type of visual artifact using a second sequence of rendered images for a scene including a first image that does not include the first type of visual artifact and a second image that does include at least one occurrence of the first type of visual artifact.

15. The computer-implemented method of claim 14, further comprising computing a first ground truth quality metric for the first image and a second ground truth quality metric for the second image.

16. The computer-implemented method of claim 1, wherein the at least one quality metric is computed using only the sequence of rendered images without using a reference image.

17. A system, comprising:
- a memory storing a sequence of rendered images; and
- a processor configured to execute instructions that implement at least a portion of a neural network model configured to:
  - receive the sequence of rendered images;
  - process the sequence of rendered images to produce at least one quality metric for the sequence of rendered images, each quality metric indicating presence or absence of a visual artifact in the sequence of rendered images; and dividing a first rendered image of the sequence of rendered images into a number of regions including at least a first region and a second region, wherein each region in the number of regions corresponds with a single pixel, and wherein the at least one quality metric includes at least one bit for each region.

18. A non-transitory computer-readable media storing computer instructions that, when executed by one or more processors, cause the one or more processors to perform the steps of:
- receiving a sequence of rendered images;
- processing the sequence of rendered images, by a neural network model, to produce at least one quality metric for the sequence of rendered images, each quality metric indicating presence or absence of a visual artifact in the sequence of rendered images; and dividing a first rendered image of the sequence of rendered images into a number of regions including at least a first region and a second region, wherein each region in the number of regions corresponds with a single pixel, and wherein the at least one quality metric includes at least one bit for each region.

* * * * *